United States Patent
Chen (10) Patent No.: US 8,960,062 B2
(45) Date of Patent: Feb. 24, 2015

(54) VISE CLAMPING TOOL FOR TABLE-TYPE CIRCULAR SAWING MACHINE

(75) Inventor: Zhifeng Chen, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 381 days.

(21) Appl. No.: 13/213,315

(22) Filed: Aug. 19, 2011

(65) Prior Publication Data

US 2012/0055309 A1 Mar. 8, 2012

(30) Foreign Application Priority Data

Sep. 7, 2010 (CN) ...................... 2010 2 0522459 U (51) Int. Cl.
*B26D 7/02* (2006.01)
*B26D 7/04* (2006.01)
*B23D 47/04* (2006.01)
*B25B 5/10* (2006.01)
*B25B 5/16* (2006.01)

(52) U.S. Cl.
CPC ................. *B23D 47/04* (2013.01); *B25B 5/102* (2013.01); *B25B 5/16* (2013.01); *B25B 5/163* (2013.01)
USPC .................................. 83/466; 83/452; 83/490

(58) Field of Classification Search
CPC ........................................................ B23D 7/04
USPC ........... 83/452, 453, 456, 457, 462, 464, 466, 83/467.1, 468.2, 468.3; 296/71, 73, 95, 296/164, 237, 238, 239, 228, 201, 3, 6
See application file for complete search history.

(56) References Cited

U.S. PATENT DOCUMENTS

| 2,866,367 | A | * | 12/1958 | Wilkes | 269/264 |
|---|---|---|---|---|---|
| 3,245,289 | A | * | 4/1966 | Nelson | 408/98 |
| 4,637,288 | A | * | 1/1987 | Olsen et al. | 83/375 |
| 5,730,434 | A | * | 3/1998 | Schoene et al. | 269/88 |
| 6,024,350 | A | * | 2/2000 | Price et al. | 269/71 |
| 6,543,323 | B2 | | 4/2003 | Hayashizaki | |
| 7,721,632 | B2 | * | 5/2010 | Chen | 83/452 |
| 2004/0173065 | A1 | * | 9/2004 | Hill | 83/13 |
| 2008/0106020 | A1 | * | 5/2008 | Sherlock | 269/71 |

FOREIGN PATENT DOCUMENTS

| CN | 200910118713 | | 11/2009 |
|---|---|---|---|
| FR | 476405 A | * | 8/1915 |
| JP | 2000084861 A | * | 3/2000 |

* cited by examiner

*Primary Examiner* — Kenneth E. Peterson
*Assistant Examiner* — Jennifer Swinney
(74) *Attorney, Agent, or Firm* — Greenberg Traurig, LLP (57) ABSTRACT

A vise clamping tool for a table-type circular sawing machine includes a rotating arm assembly connected to a supporting shaft. The rotating arm assembly has a first rotating arm connected to the supporting shaft and a second rotating arm provided with a clamping component. The second rotating arm is pivotally connected to the first rotating arm around a first pivoting axis oriented along the horizontal direction.

7 Claims, 7 Drawing Sheets

Fig. 1

Prior art

Fig. 2

Prior art

VISE CLAMPING TOOL FOR TABLE-TYPE CIRCULAR SAWING MACHINE

RELATED APPLICATION DATA

This application claims the benefit of CN 201020522459.5, filed Sep. 7, 2010, the disclosure of which is incorporated herein by reference in its entirety.

BACKGROUND

The subject disclosure relates to a clamping tool and, more particularly, to a vise clamping tool suitable for a table-type circular sawing machine.

Table-type circular sawing machines are circular sawing tools having a motor-driven rotating cutting head arranged on a working surface of a base for moving up and down. The cutting head is mainly used to cut materials which materials are held on the working surface of the base. Vise devices are commonly used to help hold the material to be cut during a cutting operation. Currently, the existing vise devices in the market are of the one-way clamp device type, that is, the vise device may rotate horizontally and fix the material to be cut from top to bottom or rotate perpendicularly and fix the material to be cut from front to rear. Such devices are only suitable for clamping a rectangular material to be cut but can not effectively clamp a circular or polygonal material, which results in some issues such as inconvenience of operation and safety in cutting.

Figure 1:
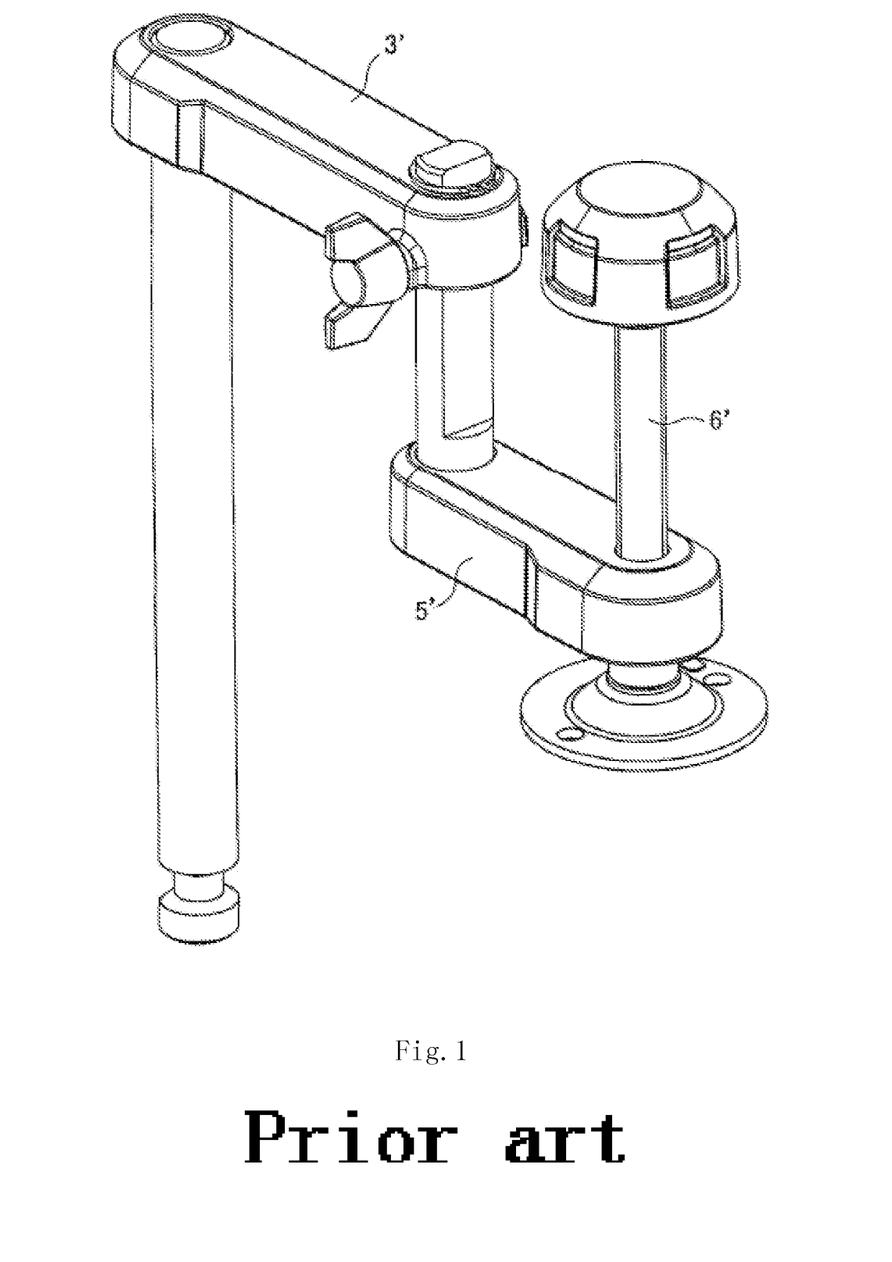
FIG. 1 is a schematic view of an existing vise device.
Figure 2:
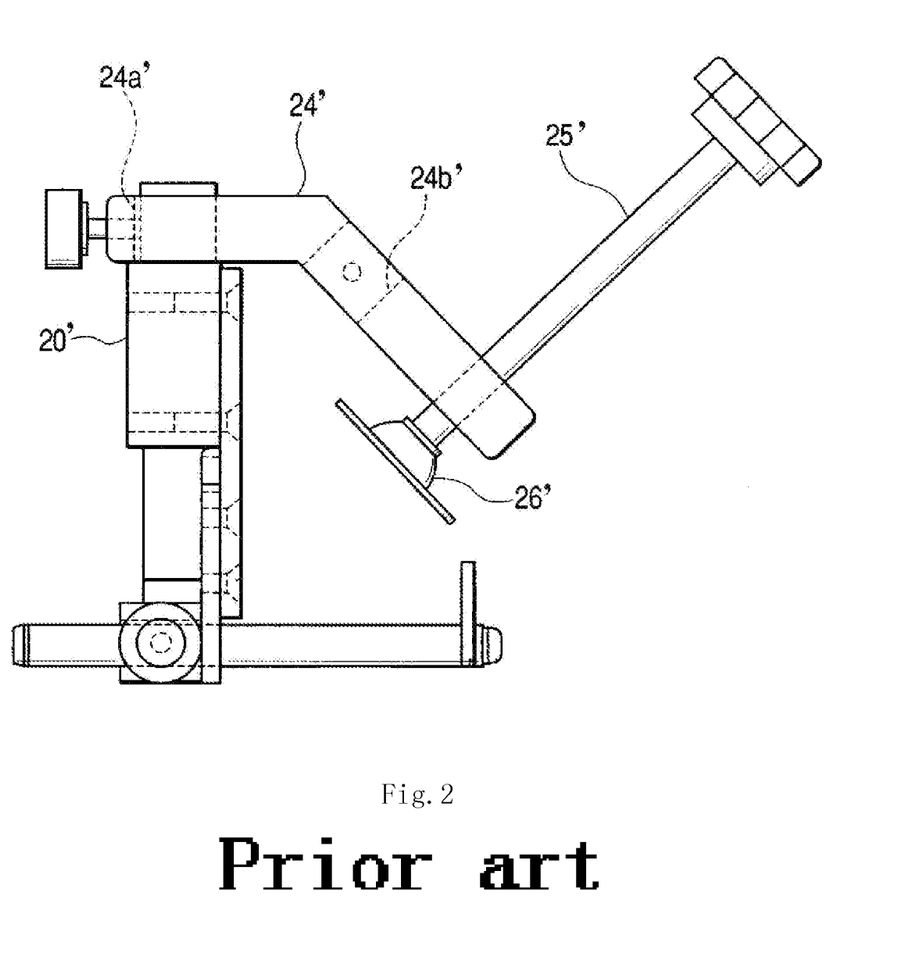
FIG. 2 is a schematic view of another existing vise device.

Two kinds of the existing vise devices are shown in FIG. 1 and FIG. 2 respectively, which are arranged on the table-type circular sawing machine in use along a substantially perpendicular direction. FIG. 1 schematically illustrates a two-stage vise device which may rotate horizontally by an angle to fix the material to be cut from top to bottom, wherein the rotating arm 3' and the auxiliary rotating arm 5' may be moved to a desired position through a horizontal rotation thereof, and the locking component 6' may be moved subsequently to fix the material to be cut from top to bottom by threads. Such device is suitable for rectangular material to be cut and this technical solution has been disclosed in detail in Chinese Patent No. 200910118713.

FIG. 2 schematically illustrates an improved vise clamping device, wherein the rotating arm 24' is bent to a specific angle such as 38° and may be fixed on the shaft 20' by two holes 24a', 24b' disposed on the rotating arm 24' respectively. The material to be cut may therefore be fixed at a specific angle and along the vertical direction respectively by the locking components 25', 26'. Such device is suitable for fixing the crown molding material at a specific angle and this technical solution has been disclosed in detail in U.S. Pat. No. 6,543,323.

SUMMARY

The following describes a vise clamping device for a table-type circular sawing machine which can freely clamp and fix the workpiece to be cut and which is suitable for clamping differently shaped workpieces, such as crown molding materials with various angles, circular workpieces, thin workpieces, etc., without replacing the vise device.

More particularly, the vise clamping device for a table-type circular sawing machine includes a supporting shaft connected to the table-type circular sawing machine and a rotating arm connected to the supporting shaft at one end thereof. The rotating arm comprises a first rotating arm connected to the supporting shaft and a second rotating arm linked with the first rotating arm, the second rotating arm being provided with a clamping component, wherein the second rotating arm is pivotally connected to the first rotating arm about a first pivot axis extending in a horizontal direction.

BRIEF DESCRIPTION OF THE DRAWINGS

The invention will be described with reference to the following figures in which.

DETAILED DESCRIPTION

A preferred embodiment of the present invention will be specifically explained hereinafter with reference to the accompany drawings, particularly FIGS. 3-9.

Figure 3:
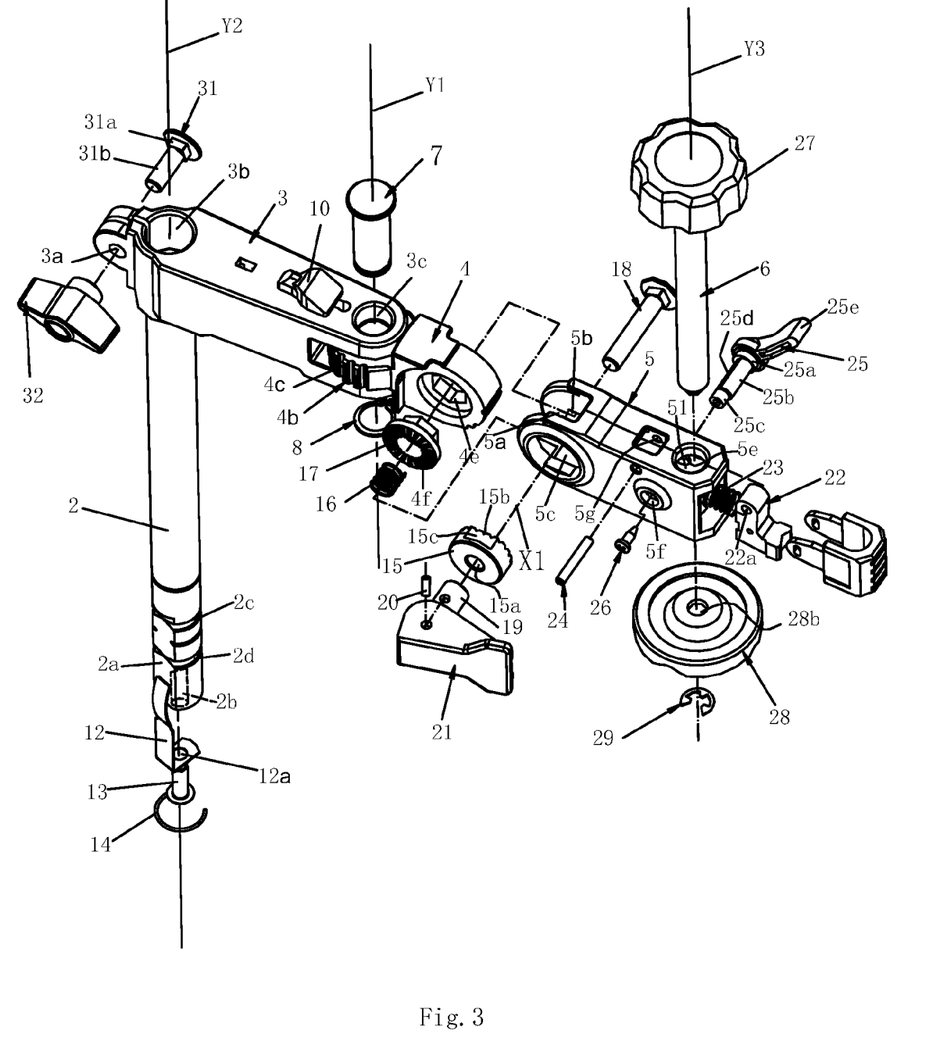
FIG. 3 is an exploded perspective view of an exemplary vise device constructed according to the present invention.

As shown in FIG. 3, a vise device comprises a supporting shaft 2 connectable to a base of a table-type circular sawing machine. A first rotating arm 3 oriented along the horizontal direction is connected to the upper end of the supporting shaft 2 at one end and pivotally linked to one end of a coupling component 4 at the other end via a connecting shaft 7 about a second pivot axis Y1 extending in the vertical direction. The other end of the coupling component 4 is pivotally connected to one end of a second rotating arm 5 about a first pivot axis X1 extending in the horizontal direction; and the other end of the second rotating arm 5 is preferably provided with a locking rod 6 oriented along the vertical direction which is equipped with a rotary manipulating knob 27 at the upper end thereof and a pressing block 28 at the lower end thereof. In the present embodiment, the longitudinal axis Y3 of the locking rod 6 extends in the vertical direction when the body of the second rotating arm 5 is oriented to be substantially horizontal.

Preferably, in the present embodiment, the supporting shaft 2 is also substantially vertically connected to the base of the sawing machine like as the two vise devices cited in the background of invention, that is, the supporting shaft 2 has a longitudinal axis Y2 that is vertical to the supporting surface for a workpiece on the base of the sawing machine. In this way, the longitudinal axis Y2 is parallel to the second pivot axis Y1 and perpendicular to the first pivot axis X1.

With such configuration, the second rotating arm 5 can be rotated relative to the first rotating arm 3 about the first pivot axis X1 for adjusting the vertical position of the other end of the second rotating arm 5 and the angle of the longitudinal axis Y3 of the locking rod 6 relative to the horizontal direction; the second rotating arm 5 can also be rotated about the second vertical pivot axis Y1 for adjusting the horizontal position of the other end of the second rotating arm 5.

Preferably, the supporting shaft 2 is configured as a rounded-bar with a first plane or first flat surface 2a formed at one end adjacent to the fixing base and a mounting hole 2b formed at this end. A L-shaped spring piece 12 is abutted against the first plane 2a with one branch thereof and formed with a hole 12a on the other branch. A threaded rod 13 passes through the hole 12a and is fixed in the mounting hole 2b. The supporting shaft 2 has a first groove 2c and a second groove 2d on its peripheral surface, wherein a spring element 14 is mounted in the first groove 2c. The second groove 2d is a deep groove with large width so as to be engaged with a locating piece 34 in a locking hole 33c formed in a cylindrical hole 33a of the base of the table-type circular sawing machine 1, so that the supporting shaft 2 can be fixed on the base of the table-type circular sawing machine 1. The cylindrical hole 33a is formed on a mounting portion 33 which is provided on the base of the sawing machine 1 or on a fence for mounting the vise device. The mounting portion 33 is formed with a flange surface (not shown) therein corresponding to the first plane 2a. The spring element 14 may be embodied as a compression spring and the locating piece 34 may be embodied as a screw.

The first rotating arm 3 is long in shape when viewed from top. One end of the rotating arm 3 that is connected to the supporting shaft 2 is provided with an opening 3a and a through-hole 3b for connecting the supporting shaft 2. The end is mounted on the supporting shaft 2 by means of the through-hole 3b and can slide along it from top to bottom. The inner wall of the opening 3a at one side is formed with a square groove for receiving a square portion 31a of a threaded rod 31, and the inner wall of the opening 3a at the other side is round-shaped through which a cylindrical portion 31b of the threaded rod 31 can pass to be locked by a locking knob 32. By screwing/releasing the locking knob 32 on/off from the threaded rod 31, the first rotating arm 3 may be locked at any position on the supporting shaft 2 or adjusted in position by sliding along the supporting shaft 2 up and down. Moreover, with the through-hole 3b and the design of the square or circular threaded rod 31, it may avoid the threaded rod 31 and the locking knob 32 rotating simultaneously during screwing and releasing operations.

Figure 4:
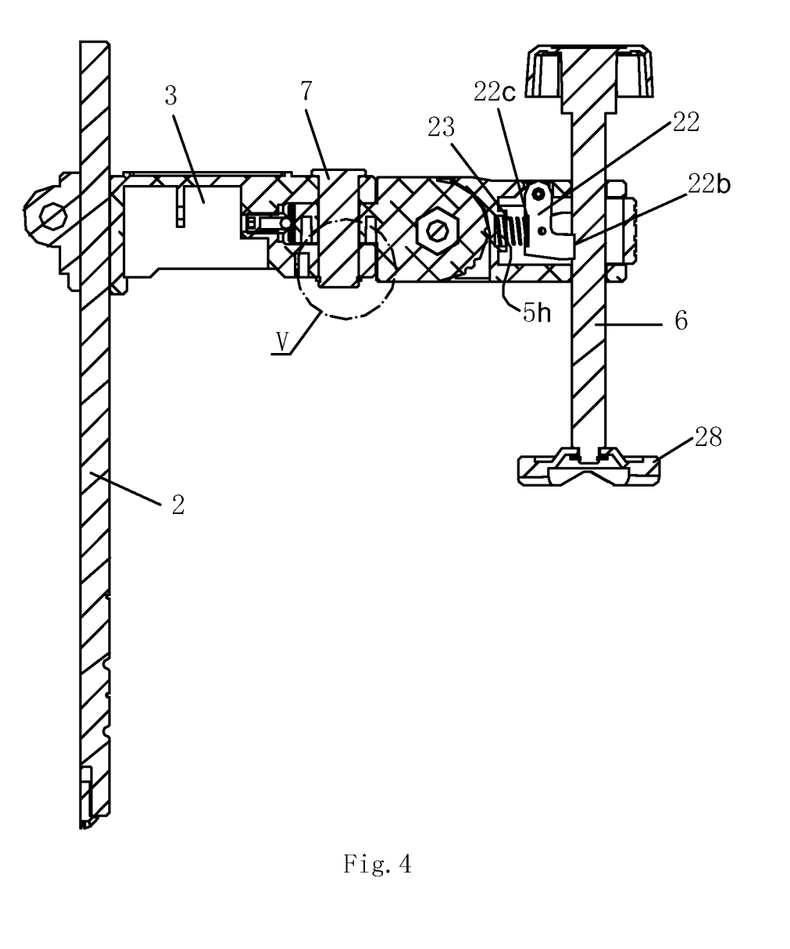
FIG. 4 is a front cross-sectional view of the vise device in FIG. 3.
Figure 5:
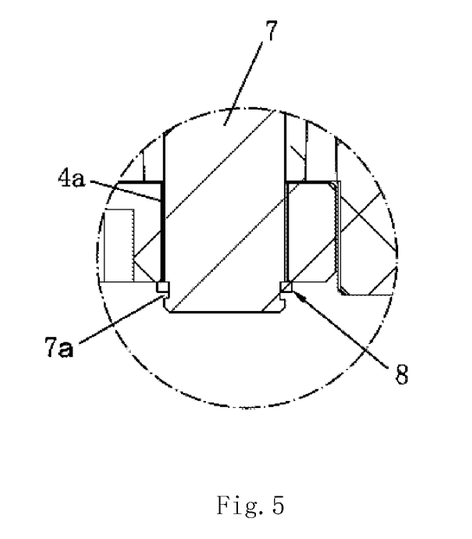
FIG. 5 is a detailed view of a coupling component of the vise device in FIG. 3.

Referring to FIG. 3 in combination with FIGS. 4 and 5, the other end of the first rotating arm 3 has a cylindrical through-hole 3c for inserting the connecting shaft 7 therethrough. The connecting shaft 7 is a T-shaped cylinder with a third groove 7a thereon. The connecting shaft 7 passes through the through-hole 3c on the first rotating arm 3 and then through a through-hole 4a of the coupling component 4 to protrude from the first rotating arm 3. The T-shaped head of the connecting shaft 7 presses and covers the periphery of the through-hole 3c. A spring fastener 8 is arranged in the groove 7a for latching the connecting shaft 7 so as to prevent it from disengaging from the first rotating arm 3 and the coupling component 4. With the above-mentioned configuration, the coupling component 4 can be rotated horizontally relative to the first rotating arm 3 about the second pivot axis Y1, so that the second rotating arm 5 can be then rotated relative to the first rotating arm 3 about the second pivot axis Y1. As a result, the other end of the second rotating arm 5 in the horizontal position can be changed. In this way, the distance between the locking rod 6 mounted on the other end of the second rotating arm 5 and the supporting shaft 2 can be changed to allow for clamping the workpieces with various widths.

Figure 6:
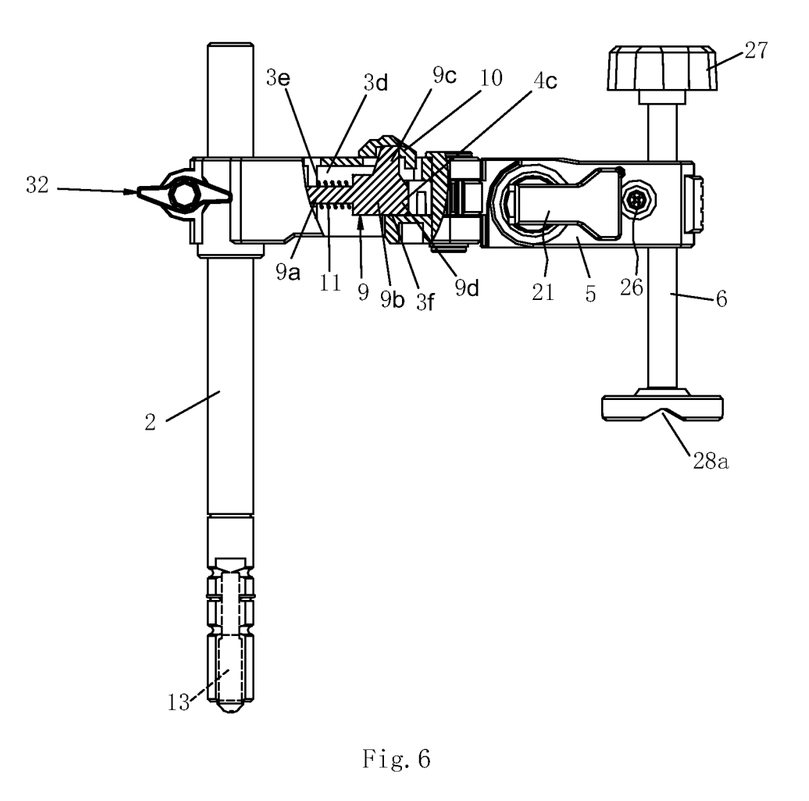
FIG. 6 is a detailed view of a fast-locking mechanism of the vise device in FIG. 3.
Figure 7:
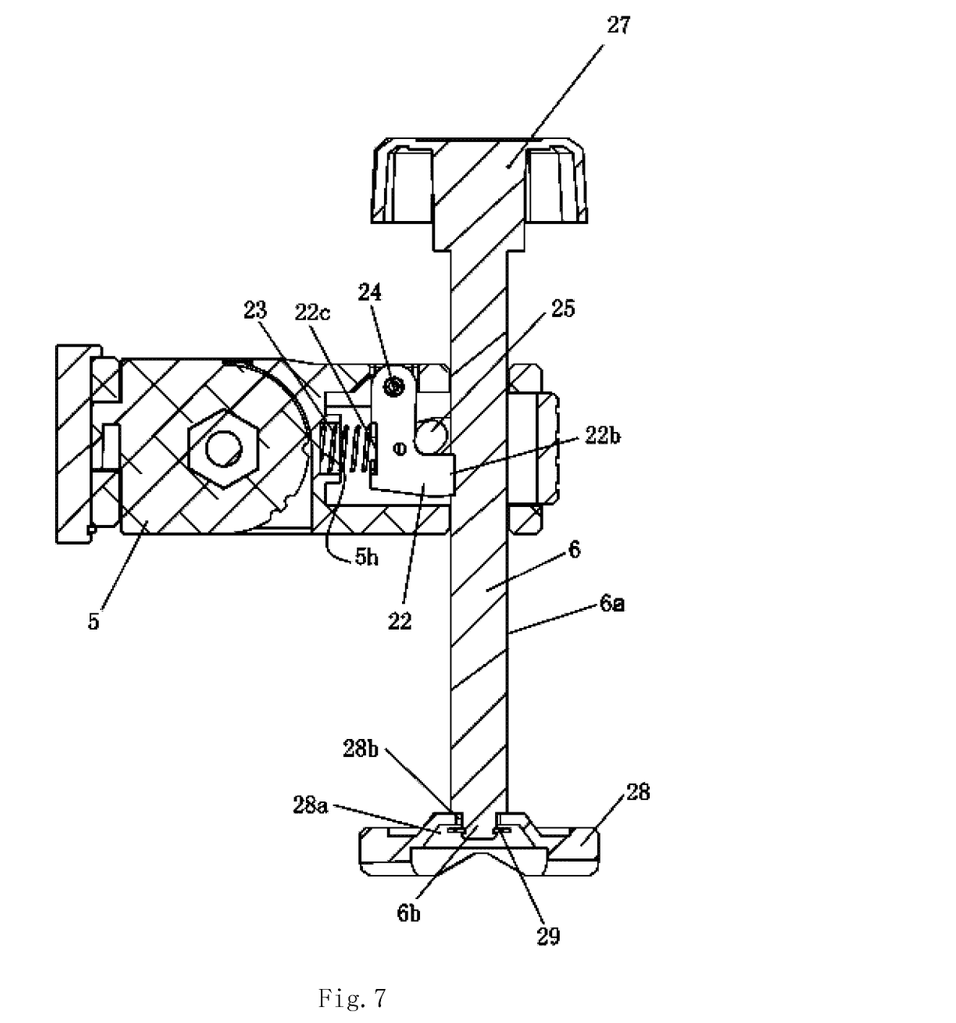
FIG. 7 is an inner detailed view of a first rotating arm of the vise device in FIG. 3.

Referring to FIG. 6, the first rotating arm 3 has an elongated slot 3d on the upper portion thereof within which a sliding component 9 is arranged. The sliding component 9 has a long arm 9a on which a spring element 11 is mounted. The spring element 11 abuts with its one end against a vertical surface 3e of the inner wall of the first rotating arm 3 to maintain an impact force for pushing the sliding component 9 toward the coupling component 4, so that a conical body 9d at the front end of the sliding component 9 abuts against the inner wall of a fourth groove 4c of the coupling component 4. As a result, a random rotation of the coupling component 4 is avoided. The two sidewalls of the elongated slot 3d are configured to be vertical for limiting the slide of the sliding component 9. The body 9b of the sliding component 9 may be moved horizontally along the bottom 3f of the elongated slot 3d. A lug 9c is formed at the upper portion of the sliding component 9 and protrudes from the elongated slot 3d, so that it can be moved by an operator to compress the spring element 11 whereupon the sliding component 9 is disengaged from the coupling component 4, and then the coupling component 4 can be rotated. Preferably, a manipulating block 10 may be mounted on the lug 9c so that the sliding component 9 can be manipulated though the manipulating block 10, resulting in that the product has an artistic appearance and can be manipulated comfortably.

Viewed from the top, the coupling component 4 has two axle holes perpendicular to each other for linking with the first rotating arm 3 and the second rotating arm 5, respectively. At the conjunction with the first rotating arm 3, the coupling component 4 is formed with the through-hole 4a (see FIG. 5) and a cylindrical coupling surface 4b. The cylindrical coupling surface 4b is formed at its periphery with a plurality of fourth grooves 4c for engaging with the aforesaid sliding component 9 so as to lock the coupling piece 4. The coupling piece 4 is formed with a through-hole 4e at the other end thereof which is perpendicular to the through-hole 4a. A threaded rod 18 passes through the through-hole 4e of the coupling piece 4 from one side of the second rotating arm 5 to assemble the second rotating arm 5 onto the coupling component 4, so that the second rotating arm 5 can be rotated relative to the coupling component 4 about the first pivot axis X1. As a result, the angle of the longitudinal axis Y3 of the locking element 6 at the other end of the second rotating arm 5 relative to the horizontal direction can be adjusted to allow for clamping the workpiece surfaces with various angles.

Referring to FIG. 3, the second rotating arm 5 is long in shape and has a U-shaped structure at the joint relative to the coupling component 4. Two sides of the U-shaped structure are formed with a square groove 5a and a hole 5c, respectively. A through-hole (not shown) is formed at the other side of the square groove 5a and is concentric with the hole 5c. A sliding block 15 which has a cylindrical through hole 15a, is mounted within the hole 5c. Umbrella-shaped grooves 15b are formed at one end of the sliding block 15, taking the circle of the cylindrical through-hole 15a as a centre. These umbrella-shaped grooves 15b are engaged with umbrella-shaped grooves 4f in a ratchet block 17 which is arranged in the through-hole 4e of the coupling component 4. Symmetrical grooves 15c are formed diametrically opposite with each other at the end of the sliding block 15. The sliding block 15 is shaped as a cylinder and can slide within the hole 5c of the second rotating arm 5. In the hole 5c, symmetrical flanges are provided for engaging with the symmetrical grooves 15c on the sliding block 15. A compression spring 16 is arranged between the sliding block 15 and the umbrella-shaped groove 4f on the ratchet block 17 within the coupling component 4. The compression spring 16 serves to push the sliding block 15 away from the umbrella-shaped groove 4f on the ratchet block 17 within the coupling component and allows the second rotating arm 5 to rotate freely in the vertical plane. The threaded rod 18 passes through the through-hole 4e of the coupling component, the compression spring 16 and the sliding block 15 from one side of the second rotating arm 5, so that the second rotating arm 5 is connected to the coupling component 4. Further, the second rotating arm 5 can be quickly locked or released by a locking plate 21 with the help of appropriate adjustment of a threaded sleeve 19. The locking plate 21 and the threaded sleeve 19 may be joined as an integral locking member by a fitting pin 20 engaging with a pin hole on the threaded sleeve 19.

Referring to FIG. 3 in combination with FIG. 6, the second rotating arm 5 is provided at the other end thereof with a quick-locking mechanism. The quick-locking mechanism comprises a locking rod 6, a manipulating knob 27 arranged at the upper end of the locking rod 6, a pressing block 28 arranged at the lower end of the locking rod 6, a tooth block 22 arranged in the hollow cavity of the second rotating arm 5 for engaging with the thread 6a on the locking rod 6, a compression spring 23 for providing an activating pressure and a driving shaft 25 for releasing.

The second long-shaped rotating arm 5 is provided at its other end with a through-hole 5l within which the cylindrical threaded portion 6a of the locking rod 6 may be fitted and slide. A through-hole 5g is formed in one side of the second rotating arm 5. A connecting pin 24 passes through the through-hole 5g on the side of the second rotating arm 5 and through a through-hole 22a in the tooth block 22 to hold the tooth block 22 in the second rotating arm 5. In this case, the tooth block 22 can swing freely therein. A compression spring 23 is arranged at the rear 22c of the tooth block 22 with its free end abutting against the inner wall 5h of the second rotating arm 5. With the spring force of the compression spring 23, the thread 22b on the tooth block 22 may abut against and engage with the cylindrical thread 6a on the locking rod 6. When the rotary knob 27 on the locking rod 6 is rotated clockwise, the tooth block 22 cannot disengage from the locking rod 6 due to the friction between the thread 6a on the locking rod 6 and the thread 22b on the tooth block 22 and the ejecting force of the compression spring 23 being larger than a lateral spiral component of the force produces by friction. As a result, the locking rod 6 may be moved downwards. Whereas, an upward movement of the locking rod 6 would be produced when the knob 27 is rotated counterclockwise.

The pressing block 28 mounted on the lower end of the locking rod 6 has a V-shaped slot 28a arranged on the end surface thereof and in the form of right-angled intersection. A through-hole 28b is formed in a central recess of the pressing block 28 in the form of disc shape. The cylindrical body 6b of the locking rod 6 passes through the through-hole 28b, and a fastener 29 may be provided to hoop the cylindrical body 6b at the free end for preventing the pressing block 28 from disengaging from the locking rod 6. There is a fit clearance between the through-hole 28b and the locking rod 6 for providing a space for appropriate swing of the pressing block 28. As a result, the contact angle of the pressing block 28 can be adjusted appropriately when it engages the workpiece to be cut.

The second rotating arm 5 has a large hole 5e at one side thereof and a concentric small hole 5f at the opposite side for installing the driving shaft 25. The diving shaft 25 has three cylinders comprising a first cylinder 25a, a second cylinder 25b and a third cylinder 25c, wherein the first cylinder 25a and the third cylinder 25c are concentric with each other and engage with the large hole 5e and the small hole 5f on the sides of the second rotating arm 5 respectively, the second cylinder 25b is an eccentric cylinder and has two parallel surfaces 25d at both sides thereof. A crank 25e is formed at one side of the first cylinder 25a. The driving shaft 25 is mounted on the second rotating arm 5 with the crank 25e thereof abutting against the side of the second rotating arm 5, at the opposite side of the second rotating arm 5, a threaded rod 26 is fixed in a shaft hole of the third cylinder 25c of the driving shaft 25 so that the driving shaft 25 can be moved but not disengage from the second rotating arm 5.

Figure 8:
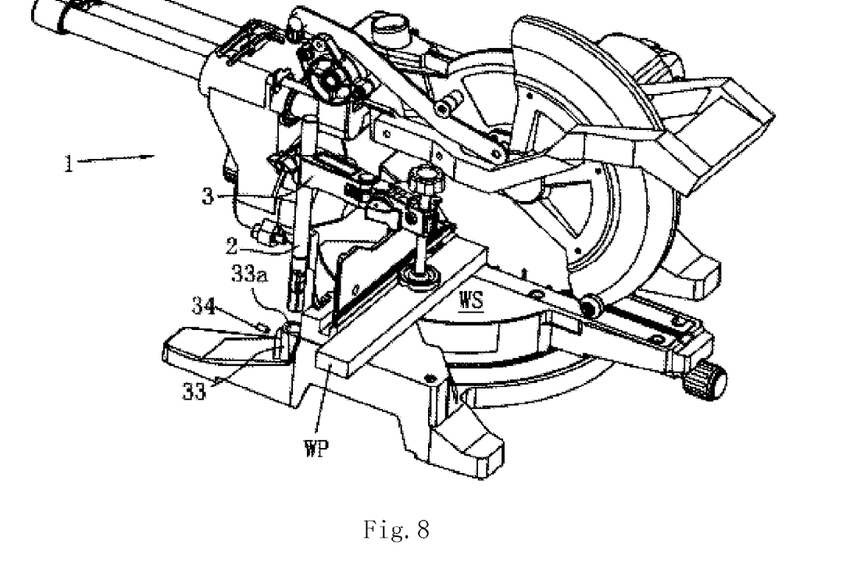
FIG. 8 is a schematic view illustrating the engagement of the vise device in FIG. 3 with a base of a sawing machine.
Figure 9:
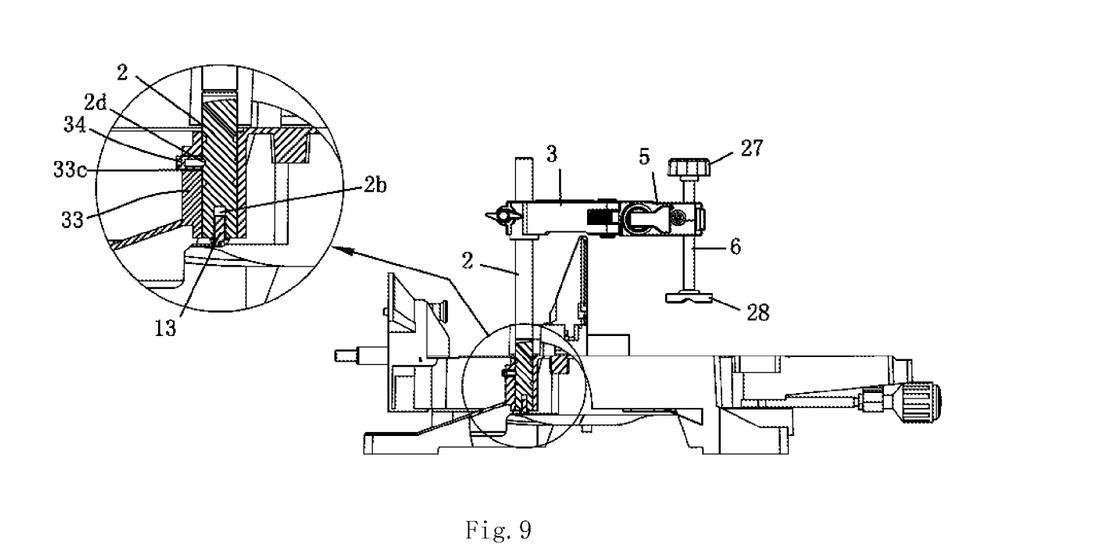
FIG. 9 is a partial cross-sectional view of the engagement shown in FIG. 8 of the vise device with the base of the sawing machine.

Referring to FIGS. 3-7 in combination with FIGS. 8-9, the operation process of the vise device in this embodiment is that:

1. Prior to operating the vise device, the supporting shaft 2 is mounted in a vertical cylindrical hole 33a on the base or fence of the table-type circular sawing machine 1, and may be set in a rotatable state and a non-rotatable state by mating with the cylindrical hole 33a. If the non-rotatable state is required, the supporting shaft 2 may be inserted into the cylindrical hole 33a in such way that the first plane 2a on the supporting shaft 2 is parallel to the flange surface of the cylindrical hole and the spring element 14 arranged on the supporting shaft 2 is fitted into the cylindrical hole 33a. If desired, the locating piece 34 provided within the cylindrical hole 33a can be adjusted to lock the supporting shaft 2 more firmly. To this end, the supporting shaft 2 of the vise device in the present embodiment is formed with the second groove 2d for engaging with the locating piece 34 arranged in the cylindrical hole 33a. When the locating piece with flexibility such as constant-pressure threaded rod 34 is installed, it can be positioned in the cylindrical hole 33a quickly and not likely to come loose. Normal threaded rods can also be used for fixing if the constant-pressure threaded rod is not available.

2. Once the supporting shaft 2 of the vise device is fixed in the vertical cylindrical hole 33a on the base or fence of the table-type circular sawing machine 1, the vise device would be manipulated to clamp the material WP to be cut placed within the cutting region WS.

3. If the material WP to be cut only needs to be clamped horizontally, a depth adjustment should be made firstly according to the height of the material WP to be cut. The methods for depth adjustment are:

a. Adjusting the first rotating arm 3 in height to make the end surface of the compressing block 28 on the quick-locking mechanism abut against the upper end surface of the material WP to be cut, screwing the locking knob 32 on the first rotating arm 3, and then rotating the rotary knob 27 clockwise to clamp the material WP to be cut, the material WP can be released by rotating the rotary knob 27 counterclockwise after being cut off; or b. Quick-lifting and quick-lowering the locking rod 6 with the quick-locking mechanism to make the end surface of the compressing block 28 abut against the upper end surface of the material WP to be cut, screwing the locking knob 32 on the first rotating arm 3, and then rotating the rotary knob 27 clockwise to clamp the material WP to be cut.

The horizontal clamping position can be adjusted by:

a. Rotating the supporting shaft 2 to cause a horizontal rotation displacement of the whole vise device; or b. Adjusting the coupling component 4 to produce a simultaneous rotation displacement of the second rotating arm 5. The process of horizontal rotation with the coupling component 4 is: pushing the manipulating block 10 away to disengage the sliding component 9 from the V-shaped fourth groove 4c horizontally arranged in the coupling component 4, and the coupling component 4 can thus be rotated horizontally within the range of 90 degrees leftward and rightward. When the coupling component 4 is adjusted to the required position, the manipulating block 10 is released, and the sliding component 9 would automatically return back to an engagement with the fourth groove 4c of the coupling component 4 for obtaining the locating function in terms of horizontal angles.

If a horizontal clamping is needed only, it is required to confirm firstly that the second rotating arm 5 and the first rotating arm 3 are horizontal and substantially parallel to each other. If not, the adjustment should be made in advance.

4. If the material WP to be cut only needs to be clamped by an angle in the perpendicular plane, the angle of the second rotating arm 5 should be adjusted firstly according to the angle of the material WP to be cut. During adjusting, first, releasing the locking plate 21 to make it perpendicular to the side of the second rotating arm 5, at this time, the sliding block 15 will be pushed by the compression spring 16 out of the engaging surface with the umbrella-shaped groove 4f on the coupling component 4, so that the second rotating arm 5 can be rotated by a rotation angle in the perpendicular direction. When the second rotating arm 5 is adjusted to adapt the angle to the material WP to be cut, e.g., with the locking rod 6 being substantially perpendicular to the material WP to be cut, the locking plate 21 should be locked to make it parallel to the side of the second rotating arm 5, and then the sliding block 15 may be engaged with the groove 4f on the coupling component 4 again by the locking plate 21 pressing it, so that the second rotating arm 5 is fixed; subsequently, quick-lifting and quick-lowering the locking rod 6 with the quick-locking mechanism to make the end surface of the compressing block 28 abut against the upper end surface of the material WP to be cut, screwing the locking knob 32 on the first rotating arm 3, and then rotating the rotary knob 27 clockwise to clamp the material WP to be cut.

5. When a thin material needs to be clamped, if necessary, the fence may be erected and the second rotating arm 5 may be adjusted to have a vertical angle of 90 degree so as to be parallel to the fence, and then the locking plate 21 would be locked parallel to the side of the second rotating arm 5. Thereby, the sliding block 15 may engage with the groove 4f on the coupling component 4 again with the compression of the locking plate 21; subsequently, lifting and lowering the locking rod 6 quickly with the quick-locking mechanism to make the end surface of the compressing block 28 abut against the upper end surface of the material WP to be cut, screwing the locking knob 32 on the first rotating arm 3, and then rotating the rotary knob 27 clockwise to clamp the material WP to be cut.

If the vertical clamping is needed only, it is required to confirm firstly that the second rotating arm 5 and the first rotating arm 3 are substantially perpendicular to each other. If not, the adjustment should be made in advance.

6. When a round material needs to be clamped, the material may be adjusted according to the size of the material WP to be cut. Normally, the device may clamp a cylinder with an angle of 45 degree.

It can be learnt from the above-mentioned description that, the vise device of this embodiment comprises a supporting shaft connected to the sawing machine and a rotating arm connected to the supporting shaft and having a locking rod; the rotating arm comprising a first rotating arm and a second rotating arm moveably connected with each other by a coupling component; the second rotating arm able to rotate relative to the first rotating arm about a horizontal first pivot axis up and down so as to adjust the clamping angle of a locking component, and/or to rotate horizontally relative to the first rotating arm about a vertical second pivot axis so as to adjust the distance between the locking component and the supporting shaft. Obviously, the feature that the second rotating arm may horizontally rotate relative to the first rotating arm about the vertical pivot axis can also be implemented by rotating the whole rotating arm about the longitudinal axis of the supporting shaft, that is, the coupling component may be integrally formed on the end of the first rotating arm and the second rotating arm may only be rotated in the plane of the supporting shaft.

According to the above aspect of this invention, the vise device may be conveniently operated in the horizontal and perpendicular directions and may be appropriately changed depending on the workpiece to meet the requirements of clamping the workpiece material. It is convenient and reliable especially for the applications for clamping the round and polygonal materials, and the safety is also enhanced.

According to the above aspect of this invention, the vise device may only be rotated in the vertical direction, namely, the first rotating arm is directly connected with the second rotating arm, so that the angle in the vertical direction can be changed in a range of 0-90 degrees for clamping flat, round and polygonal materials; moreover, the spatial rotation in the horizontal and vertical directions can also be achieved by using the coupling component, and thus the types of materials to be clamped are further broadened.

According to the above aspect of this invention, the coupling component may be replaced by circular body to achieve the non-directional spatial changes except for the horizontal and perpendicular directions.

Moreover, the locking mechanism of the coupling component may also be a spring and steel ball, pin component, elastic sheet, sliding component, swing type mechanism and so on, which can snap fit with the groove of the coupling component and obtain the locate function with the locating directions in the axial direction and radial direction respectively.

The locking mechanism of the second rotating arm may also be a pin component, elastic sheet and so on, which can snap fit with the groove on the outer circle of the coupling component and obtain the locate function.

The above contents are preferable embodiments of the present invention, but are not to limit the present invention. All the technical solutions obtained by equal replacement or equivalent change may fall into the protection scope of the present invention.

What is claimed is:

1. A vise clamping tool for a table-type circular sawing machine, which is used for fixing the material to be cut, comprising:
    a vertical supporting shaft adjustably connectable to the table-type circular sawing machine having a generally horizontal work surface; and
    a rotating arm pivotally connected to the supporting shaft, the rotating arm comprising a first rotating arm portion, a coupling component, and a second rotating arm portion,
    wherein the first rotating arm portion comprises:
        a first vertical through hole for pivotally receiving the supporting shaft;
        a second vertical through hole for receiving a vertical pivot pin; and
        a horizontal slot for pivotally receiving a first end of the coupling component about the vertical pivot pin, and
    wherein the second rotating arm portion comprises:
        a vertical through hole for receiving a locking element;
        a horizontal through hole for receiving a horizontal pivot pin; and
        a vertical slot for pivotally receiving a second end of the coupling component about the horizontal pivot pin.

2. The vise clamping tool for a table-type circular sawing machine according to claim 1, wherein the supporting shaft has a longitudinal axis which is perpendicular to a longitudinal axis of the horizontal pivot pin.

3. The vise clamping tool for a table-type circular sawing machine according to claim 1, wherein the locking element has a longitudinal axis perpendicular to a longitudinal axis of the vertical pivot pin.

4. The vise clamping tool for a table-type circular sawing machine according to claim 1, wherein the first rotating arm portion is provided with a first coupling end protruding outwards and having a hole therein and the second rotating arm portion is provided with a hole in each of opposite sidewalls of the second rotating arm at one end thereof and wherein a locking plate device is passed through the hole of the first rotating arm and the holes of the second rotating arm.

5. The vise clamping tool for a table-type circular sawing machine according to claim 4, wherein the locking plate device comprises a ratchet block arranged in the hole of the first rotating arm portion, a sliding block arranged in a one of the holes of the second rotating arm portion, and a threaded rod passing through the other of the holes of the second rotating arm portion, a ratchet block and a sliding block extending from the other of the holes of the second rotating arm portion and rotatably connected with a locking plate and wherein the sliding block and the ratchet block are engaged with each other at the mating surfaces thereof, and a compression spring is arranged between the two mating surfaces.

6. The vise clamping tool for a table-type circular sawing machine according to claim 1, wherein the first end of the coupling component has a groove in a surface thereof and the first rotating arm portion is provided with a locking mechanism selectively engaged with the groove.

7. The vise clamping tool for a table-type circular sawing machine according to claim 6, wherein the locking mechanism comprises a sliding element arranged in an elongated slot of the first rotating arm portion, where the sliding component is engagable at one end with the groove on the first end of the coupling component by a spring element, and a lug formed on the sliding component at one side thereof, where the lug protrudes from a surface of the first rotating arm portion for use in disengaging the sliding element from the first end of the coupling component.

* * * * *